(12) United States Patent
Bernhart

(10) Patent No.: US 8,760,313 B2
(45) Date of Patent: Jun. 24, 2014

(54) DISPLAY DEVICE FOR AN ACTUATOR AND ACTUATOR FOR AN ARMATURE

(75) Inventor: Patrick Bernhart, Albersweiler (DE)

(73) Assignee: PS Automation GmbH, Bad Duerkheim (DE)

( * ) Notice: Subject to any disclaimer, the term of this patent is extended or adjusted under 35 U.S.C. 154(b) by 310 days.

(21) Appl. No.: 13/127,344

(22) PCT Filed: Nov. 3, 2009

(86) PCT No.: PCT/EP2009/007864
§ 371 (c)(1),
(2), (4) Date: May 3, 2011

(87) PCT Pub. No.: WO2010/060527
PCT Pub. Date: Jun. 3, 2010

(65) Prior Publication Data
US 2011/0215943 A1 Sep. 8, 2011

(30) Foreign Application Priority Data

Nov. 3, 2008 (DE) .......................... 10 2008 055 658
Dec. 22, 2008 (DE) .......................... 10 2008 064 406

(51) Int. Cl.
*G08B 3/00* (2006.01)

(52) U.S. Cl.
USPC .................. 340/691.6; 340/870.02; 324/156; 324/157; 324/110; 324/114; 475/170; 475/305; 475/331

(58) Field of Classification Search
USPC .......... 340/691.6, 870.02; 324/156, 157, 110, 324/114; 475/170, 305, 331
See application file for complete search history.

(56) References Cited

U.S. PATENT DOCUMENTS 2,058,067 A * 10/1936 Durant .......................... 340/319
2,330,397 A * 9/1943 Trofimov .......................... 475/5
(Continued)

FOREIGN PATENT DOCUMENTS

DE  102008064406 A1 * 5/2010 .............. F16K 37/00
JP       61132433 A * 6/1986 .............. B60K 41/14
(Continued)

OTHER PUBLICATIONS

International Search Report issued Mar. 5, 2010 in International Application No. PCT/EP2009/007864.
(Continued)

*Primary Examiner* — George Bugg
*Assistant Examiner* — Paul Obiniyi
(74) *Attorney, Agent, or Firm* — Akerman LLP; Peter A. Chiabotti

(57) ABSTRACT

The invention relates to a display device (54) for an actuator having at least one mechanical display element (10, 11) and a variable speed gear unit, particularly a signal gear unit designed as a variable speed gear unit, having at least two gears with differing transmission ratios, wherein there is a mechanical switching arrangement with which the different gears and/or transmission ratios of the variable speed gear unit can be selected and/or switched even when the display device is mounted operationally ready in a housing without intervention into the housing and without opening the housing from outside, and/or wherein the resolution of the display device (54) and/or the movement of the at least one display element (10, 11) on the actuating path to be displayed of a respective actuator and/or a respective armature can be selectively adjusted. The invention furthermore relates to an actuator having a said type of display device (54).

22 Claims, 8 Drawing Sheets

(56) References Cited

U.S. PATENT DOCUMENTS

| | | | | |
|---|---|---|---|---|
| 2,767,681 | A | 10/1956 | Pontius | |
| 2,875,411 | A * | 2/1959 | Lamb | 324/151 R |
| 3,006,220 | A * | 10/1961 | Feaster | 475/154 |
| 3,014,112 | A * | 12/1961 | Herman | 200/528 |
| 3,077,794 | A * | 2/1963 | Candellero | 475/285 |
| 3,323,497 | A * | 6/1967 | Paschke | 418/57 |
| 3,418,043 | A * | 12/1968 | Williams et al. | 353/25 |
| 3,665,446 | A * | 5/1972 | Burm et al. | 340/815.56 |
| 3,689,835 | A * | 9/1972 | Bickfrod | 324/115 |
| 3,710,042 | A * | 1/1973 | Edwards et al. | 200/17 R |
| 3,805,158 | A * | 4/1974 | Delisle et al. | 324/157 |
| 4,106,095 | A * | 8/1978 | Yarbrough | 705/412 |
| 4,209,273 | A * | 6/1980 | Lehnen | 408/9 |
| 4,411,288 | A * | 10/1983 | Gain, Jr. | 137/363 |
| 4,588,949 | A * | 5/1986 | Becker et al. | 324/110 |
| 4,602,211 | A * | 7/1986 | Losapio et al. | 324/103 R |
| 4,638,314 | A * | 1/1987 | Keller | 340/870.02 |
| 4,686,460 | A * | 8/1987 | Stevens et al. | 324/142 |
| 4,783,623 | A * | 11/1988 | Edwards et al. | 324/156 |
| 4,792,677 | A * | 12/1988 | Edwards et al. | 250/231.13 |
| 4,803,484 | A * | 2/1989 | Schutrum et al. | 340/870.02 |
| 4,910,519 | A * | 3/1990 | Duell et al. | 341/157 |
| 4,959,607 | A * | 9/1990 | Coryea et al. | 324/103 R |
| 4,977,368 | A * | 12/1990 | Munday et al. | 324/142 |
| 5,014,213 | A * | 5/1991 | Edwards et al. | 702/62 |
| 5,025,206 | A * | 6/1991 | Germer et al. | 324/74 |
| 5,034,682 | A * | 7/1991 | Mayo et al. | 324/142 |
| 5,087,875 | A * | 2/1992 | Balch et al. | 324/157 |
| 5,173,657 | A * | 12/1992 | Holdsclaw | 324/142 |
| 5,184,064 | A * | 2/1993 | Vicknair et al. | 324/156 |
| 5,196,824 | A * | 3/1993 | Helm | 340/450.3 |
| 5,214,587 | A * | 5/1993 | Green | 702/60 |
| 5,409,037 | A | 4/1995 | Wheeler et al. | |
| 5,457,371 | A * | 10/1995 | Gordon | 318/661 |
| 5,717,423 | A * | 2/1998 | Parker | 345/108 |
| 5,926,015 | A * | 7/1999 | Pharr | 324/114 |
| 6,025,788 | A | 2/2000 | Diduck | |
| 6,165,099 | A * | 12/2000 | Pieper | 475/305 |
| 6,280,805 | B1 * | 8/2001 | Markovich | 428/34.1 |
| 6,528,986 | B2 * | 3/2003 | Ballard | 324/142 |
| 6,747,446 | B1 * | 6/2004 | Voisine et al. | 324/156 |
| 6,921,349 | B2 * | 7/2005 | Glockler | 475/210 |
| 6,960,147 | B2 * | 11/2005 | Kolstrup | 475/170 |
| 7,019,667 | B2 * | 3/2006 | Petite et al. | 340/870.02 |
| 7,504,964 | B2 * | 3/2009 | Brennan et al. | 340/870.02 |
| 7,522,067 | B2 * | 4/2009 | Jensen et al. | 340/691.1 |
| 7,794,354 | B2 * | 9/2010 | Bradshaw | 475/282 |
| 7,889,094 | B2 * | 2/2011 | Gilbert et al. | 340/815.45 |
| 8,065,782 | B2 * | 11/2011 | Lee | 29/243.56 |
| 8,098,168 | B2 * | 1/2012 | Schamber et al. | 340/870.02 |
| 8,169,304 | B2 * | 5/2012 | Schuman et al. | 340/286.07 |
| 8,188,884 | B2 * | 5/2012 | Randall et al. | 340/870.02 |
| 8,471,194 | B2 * | 6/2013 | Dolenti et al. | 250/231.13 |
| 2004/0097325 | A1 * | 5/2004 | Kolstrup | 475/331 |
| 2004/0113812 | A1 * | 6/2004 | Bianchi et al. | 340/870.02 |
| 2004/0266578 | A1 * | 12/2004 | Glockler | 475/210 |
| 2007/0008171 | A1 * | 1/2007 | Bowman | 340/870.02 |
| 2007/0168061 | A1 | 7/2007 | Iefuji et al. | |
| 2007/0171092 | A1 * | 7/2007 | Allgood | 340/870.02 |
| 2007/0268123 | A1 * | 11/2007 | Jung et al. | 340/531 |
| 2008/0068930 | A1 * | 3/2008 | Richter et al. | 368/34 |
| 2008/0197993 | A1 * | 8/2008 | Hatanaka | 340/441 |
| 2009/0203485 | A1 * | 8/2009 | Bradshaw | 475/207 |
| 2009/0250483 | A1 * | 10/2009 | Lee | 221/13 |
| 2009/0309749 | A1 * | 12/2009 | Gilbert et al. | 340/815.45 |
| 2010/0001177 | A1 * | 1/2010 | Dolenti et al. | 250/231.15 |
| 2010/0012874 | A1 * | 1/2010 | Dolenti et al. | 251/213 |
| 2011/0215943 | A1 * | 9/2011 | Bernhart | 340/691.6 |

FOREIGN PATENT DOCUMENTS

| | | | |
|---|---|---|---|
| JP | 03204461 A * | 9/1991 | F16H 61/02 |
| WO | 93/10834 | 6/1993 | |

OTHER PUBLICATIONS

Translation of Written Opinion of the International Searching Authority issued May 3, 2011 in International Application No. PCT/EP2009/007864.

* cited by examiner

DISPLAY DEVICE FOR AN ACTUATOR AND ACTUATOR FOR AN ARMATURE

CROSS REFERENCE TO RELATED APPLICATION

This application is a §371 National Phase of PCT/EP2009/007864, filed Nov. 3, 2009, which claims priority to German Application No. 10 2008 055 658.0, filed Nov. 3, 2008, and German Application No. 10 2008 064 406.4, filed Dec. 22, 2008, the entirety of which are hereby incorporated by reference.

BACKGROUND

The invention relates to a display device for an actuator, and an actuator for a fitting having such a display device.

For activating actuating elements such as fittings, for example, as used in numerous processes in automotive engineering, in particular in power generation, water management, water conditioning, and the pharmaceutical, chemical, petroleum, and/or food industries, actuators are generally used which are designed as a part or section of the particular associated control loop or as part of the particular associated control device or process control system.

Actuators are currently used as a link between the control system and/or manufacturing execution system (MES) and the particular process in automated systems in practically all industrial sectors and fields in which material and/or mass variables are to be controlled or regulated. In this regard, the actuators used act primarily on fittings which are suitable for influencing or acting on the material or mass flow. These fittings include, among others, valves, plug valves, flap valves, or slide valves. A distinction may be made among different types of actuators, the differences relating essentially to the particular type of drive and operation, i.e., in particular whether such a drive is for control or regulation purposes, and whether the drive is operated pneumatically, hydraulically, electrically, or manually. Another option is differentiation according to the type of actuating motion, in particular whether the motion occurs in a linear, swiveling, or rotational manner.

The actuator is primarily designed as a rotary drive which acts with a torque on the particular fitting, in particular a threaded spindle or shaft of the fitting, for example via a threaded bushing or a reduction gear unit having a positive-fit connection with the shaft. The threaded spindle is connected at one end to a slide plate, for example, which may be displaced or moved by the applied torque in a guide between two end positions, from the "open" to the "shut" position, and vice versa.

To carry out the complete adjustment path, the so-called "fitting lift," the actuator and/or the drive spindle must undergo from a few revolutions to several hundred to several thousand revolutions, depending on the fitting and the reduction gear unit. To also be able to obtain information concerning the particular adjustment position for an installed or inset fitting, the actuator includes a display device which is generally appropriately sealed, installed, and mounted in a housing for protection from soiling and/or moisture.

The particular display device may be designed as a mechanical, electromechanical, or electrical display, its essential task being to indicate the adjustment position and in particular the instantaneous lift of the particular fitting.

So that the particular adjustment position, in particular the adjustment lift, is retrievable or available at all times, in particular also for operation-related malfunctions of the fitting or failure of the actuator, for example during power interruptions, the use of mechanical display devices is recommended, in particular also with regard to safety aspects.

Such mechanical display devices generally include a gear unit which is coupled to the drive, in particular to the output drive shaft and/or the drive spindle, and a corresponding display element, for example a pointer, scale, dial, or the like, the gear unit causing a motion of the display element which is proportional to the number of revolutions of the spindle and/or the output drive shaft, by means of a predetermined, fixed gear ratio or reduction ratio. The proportionality factor is specified essentially by the design and length of the threaded spindle, and/or the gear ratio of the gear unit for torque multiplication, and/or the adjustment path of the fitting and thus of the possible number of revolutions of the output drive of the actuator between the two end positions of the fitting and the desired and/or available display range. Of course, the desired resolution and/or display accuracy also play a role here.

Since it is known that an actuator having a display device, when properly used, should be usable in the most universal manner possible for numerous different fittings having in particular different adjustment paths, and should meet the requirements thereof, a gear ratio which is adapted to same, and thus a corresponding gear unit or signal gear unit of the display device, must be selected or set up in each case as a function of the particular adjustment path or the gear reduction for torque generation. This occurs before the display device is installed or used, by an appropriate selection and matching of the individual toothed gears which form the gear unit.

Lastly, the particular display device is then installed in an appropriate housing, which is generally associated with the actuator, whereby appropriate sealing means may be provided between the display device and the housing and the various housing components in order to protect the display device and in particular the gear unit from contaminants and moisture, especially from functional impairment due to external influences.

Since the particular actuator is initially manufactured and marketed separately from the particular fitting, individual adjustment operations for the particular signal gear unit may be necessary before delivery or use for various uses or fields of application (adjustment paths, gear reductions).

To meet the above-mentioned requirements, either various types may be provided with a different fixed gear ratio, or a fixed gear reduction and therefore different signal gear units may be provided and prepared, which at least greatly increases the logistical complexity, and/or a variable-speed gear unit having different selectable gear ratios may be provided.

However, even for known display devices having a signal gear unit designed as a variable-speed gear unit, for changing boundary conditions and/or requirements, for example a replacement of the fitting and/or a change in the particular adjustment path of the fitting which requires adjustment of the gear ratio, it is disadvantageous that the display device must be removed from the housing and/or the drive in order to select a different gear ratio and/or to open the housing in order to adjust the particular signal gear unit. A measure which makes it necessary to open the housing or even to uninstall the display device, which removes—even if only temporarily—the protection of actuator components from environmental influences, or interferes with or interrupts the operational readiness of the display device as well as the entire drive and the fitting, is also referred to as "intrusive." Conversely, measures or operations which require no such deinstallation and therefore essentially maintain and/or ensure the operational readiness of the display device and/or the drive and/or the fitting are also referred to as "nonintrusive."

Thus, the issue is basically whether the desired or necessary manipulation or adaptation may be carried out without "intruding" (nonintrusively), with the advantage that damage from penetrating water, for example, is not possible during the actual operation or measure, or malfunction cannot result during or after reclosure on account of a wedged cable or improper seal, for example.

Thus, it is disadvantageous that opening the particular housing and/or removing the signal gear unit of the display device increases the risk of contamination or soiling, as well as the risk of malfunction (leaks, for example), in particular also as the result of faulty assembly.

Furthermore, the removal, replacement of the gear unit, and/or change of the gear ratio, as well as installing and sealing the housing, also entails a considerable level of effort.

SUMMARY

The object of the invention, therefore, is to provide an improved option which may be flexibly used and easily operated for displaying the position of a fitting and/or an actuator.

This object is achieved by a display device having the features of claim 1. Advantageous embodiments and refinements of the display device as well as an actuator having such a display device are stated in further claims and in the following description.

The display device according to the invention for an actuator includes at least one mechanical display element and a signal gear unit designed as a variable-speed gear unit, having at least two gears with different gear ratios, wherein a switching system is provided which is accessible and/or operable via the front side, i.e., front and/or front region, by means of which the different gears and/or gear ratios of the variable-speed gear unit may be selected and/or switched from the outside, i.e., outside the housing, even when an operationally ready display device is installed or inset in a housing, without intrusion into the housing and without opening the housing, and/or wherein the resolution of the display device and/or the motion of the at least one display element on the adjustment path of a particular actuator to be displayed and/or of a particular fitting may be selectively adjusted.

In one advantageous embodiment, at least one drive wheel is provided, via which the gear unit and thus also the at least one display element may be coupled and/or connected in a positive-fit or friction-fit manner to a drive, in particular an actuator, in such a way that the at least one display element carries out a motion which is proportional to a motion of the drive, in particular of the drive shaft and/or the output drive shaft and/or the spindle of the drive.

The at least one display element may advantageously be designed as a pointer, roller, dial, or ring, in particular a ring having inner gearing, wherein by means of the at least one display element in particular rotary motions may be carried out, and/or the motion of the at least one display element is a rotary motion.

In a further aspect, the variable-speed gear unit (signal gear unit) is designed as a multistage gear unit, in particular having five or more stages.

The signal gear unit of the display device which is designed as a variable-speed gear unit may advantageously be situated between or on multiple support elements and structured in multiple levels, i.e., gear unit levels, whereby the gear unit may be situated in particular between or on three support elements, and the support elements are essentially used for accommodating and/or guiding and/or retaining shafts and axles of the toothed gears used. The various support elements are separated at a distance from one another by spacers, and are oppositely situated and aligned in parallel.

The variable-speed gear unit (signal gear unit) may advantageously be designed as a spur gear unit.

In another embodiment it may be provided that the variable-speed gear unit includes at least one toothed gear set having multiple intermeshing toothed gears arranged in a partial circle, in particular a semicircle, which cooperate with the at least one display element via the switching system.

It may also be provided that the variable-speed gear unit has at least one stepped toothed gear, i.e., a toothed gear having two ring gears with different gearing, and/or that in each case multiple toothed gears, in particular two toothed gears, having different toothing are situated and/or fixed one behind the other on a shaft, and/or multiple toothed gears, in particular two toothed gears, having different toothing are rigidly joined together and rotatably situated one behind the other on an axle.

Furthermore, it is advantageously provided that, behind a third support element (in the viewing direction from the front side, facing the display device and the third support element) in a third gear unit level a first toothed gear set having a first intermediate wheel (planet wheel) which is centrally rotatable (coaxially with the system) with respect to the display device, in particular rotatably supported on a central support, and having outer gearing is provided which may also have a comparatively large number of teeth, in particular 73 teeth, depending on the drive and/or the display device. This first intermediate wheel or planet wheel is used as a central coupling element between the particular drive and in particular the drive wheel and the display device, and always allows an in particular horizontal orientation of the display device, regardless of the mounting position of the particular drive and/or the particular fitting. Also, depending on the design, one or more additional toothed gears may be connected between the drive and the first intermediate wheel.

In another embodiment, the first intermediate wheel or planet wheel, optionally also via at least one additional toothed gear having outer gearing, cooperates with a first stepped toothed gear having outer gearing, one toothed gear stage being situated in the third gear unit level and one toothed gear stage being situated in the next, second gear unit level on a common axle or shaft. Instead of a stepped toothed gear, two toothed gears which are situated on a shaft one behind the other and rigidly or fixedly connected to the shaft may be provided.

In another design, the second gear unit level, which includes the actual variable-speed gear unit (signal gear unit) and a second toothed gear set associated therewith, is defined and specified, i.e., delimited, by a third and second support element.

It may also be provided that the second toothed gear set includes multiple intermeshing toothed gears arranged in a partial circle, in particular a semicircle, which cooperate with the at least one mechanical display element via the switching system.

In one advantageous embodiment, as an alternative to a stepped toothed gear in each case multiple toothed gears, in particular two toothed gears, having different toothing may be situated and/or fixed one behind the other on a shaft, and/or multiple toothed gears, in particular two toothed gears, having different toothing may be rigidly joined together and rotatably situated one behind the other on an axle, in particular spaced apart from one another.

In one advantageous design, the switching system includes a clip-like and/or web-like switching element which is mounted and/or retained at or on a selector shaft or is fixedly connected thereto.

In a further embodiment, the selector shaft passes through at least the first support element and the second support element, and projects beyond the first support element and/or the front side, i.e., front, of the display device, so that the switching element is operable even when the display device is installed and in operation.

However, this means that the variable-speed gear unit or the various gear ratios may be operated and/or switched or selected from the outside, even when a display device is installed in a housing and is in operation, without removing or intruding into the display device and/or the housing, in particular without opening the housing.

For simplified operation, a control element may advantageously be provided on the distal, i.e., outer, end of the selector shaft which projects or protrudes from the front side of the display device.

Using the control element, the desired gear ratio is externally adjustable, even in the inset and/or installed state in a housing, in such a way that it is not necessary to remove the display device and/or open the housing in order to adjust the gear ratio.

The control element may have means for attaching a tool and/or applying a torque to the selector shaft, such as a slot, a hexagon head or hexagon socket, or a pushbutton or rotary pushbutton, for example.

It is pointed out that in one advantageous refinement, the shafts which project beyond the front of the display device, in particular selector shafts and adjustment shafts, are longitudinally adapted and dimensioned in such a way that the shafts and/or provided control elements are still accessible from the front side, even after the display device is installed in a housing and/or in an actuator, and optionally after a cover is put on, for example also as part of the housing of the actuator.

In an improvement of the display device, a pin and/or an axle having at least one first ratchet wheel supported in a rotatably movable manner, and a toothed gear having outer gearing which in predetermined switching positions is in operative connection with each respective toothed gear of the variable-speed gear unit of the second level or which is engaged with same, is provided on the clip-like and/or web-like switching element. In addition, a further, second ratchet wheel is provided on the selector shaft in front of the switching element (in the viewing direction from the front side of the display device facing the planet wheel, or viewed from the first support element in the direction of the second support element).

In another embodiment it may be provided that the first ratchet wheel which is supported in a rotatably movable manner is engaged with a second ratchet wheel which is supported on the selector shaft in a rotatably movable manner and cooperates with same, and in predetermined switching positions the first ratchet wheel is engaged with a respective further toothed gear of the variable-speed gear unit and cooperates with same.

It may advantageously be provided that the second ratchet wheel is in continuous operative connection with at least one first adjusting wheel or engages with same, and also engages with one or more adjusting wheels, depending on the number of display elements, and the adjusting wheel(s) may preferably be coupled to or with the display elements via an appropriate coupling.

The coupling may be, for example, a slide coupling and/or a magnetic clutch or magnetic coupling.

In another embodiment, securing means are advantageously provided so that the clip-like and/or web-like switching element may be secured and/or locked and/or snap-locked in the particular switching positions to prevent inadvertent twisting. In principle, the switching element may also have a U- or V-shaped geometry.

In a refinement, the securing means may include at least one locking bar, in particular in the form of a pin or bolt or latch tab, situated or provided on the switching element. This locking bar may also be integrally molded onto the switching element.

In this regard, it may also be provided that the securing means include recesses or eyes, in particular in a support element, provided at the predetermined switching positions for locking the switching element, which in particular are adapted to the size and/or shape of the respective locking bar.

As a further securing means, in another design it may advantageously be provided that the selector shaft which supports or accommodates the web-like or clip-like switching element is, and/or is held, under elastic pretension, and as a result of the elastic pretension is fixed and/or held in the predetermined switching positions, in that the particular locking bar is pressed into the corresponding recess and is also held there in a rotationally fixed manner due to the pretension.

Only when a force acts in the longitudinal direction and/or axial direction on the selector shaft, against the elastic pretension, is it possible to unlock the switching system and in particular the switching element, thus allowing selection of a different switching position by turning the switching element, and selection of a different gear ratio.

In another design, the switching system has at least two lock and/or catch positions, but in particular a number of lock and/or catch positions which corresponds to the number of gears and/or gear ratios of the variable-speed gear unit (signal gear unit). In particular three, four, five, or six gears, and thus also three, four, five, or six switching positions, may be provided.

In one refinement of the invention, the catch and/or lock positions are situated and/or distributed on a partial circle, in particular a semicircle, and/or are situated approximately equidistantly on the partial circle.

In one preferred embodiment, a recess and/or groove in the shape of a partial circle for guiding the switching element is introduced into the third support element or provided at that location. This recess is used as an opening in which the axle of the first ratchet wheel is able to move when the gear is shifted, and/or in which the axle of the first ratchet wheel is guided.

In a refinement, it may be provided that when the display device is driven, all toothed gears of the variable-speed gear unit of the second level are always in motion, regardless of the gear ratio selection.

It is particularly advantageous when all toothed gears used are designed as spur gears and/or are made of plastic, thus greatly simplifying the manufacturing process.

In addition, the support elements may be formed from printed circuit boards or printed circuit board material.

It may advantageously be provided that multiple, in particular four, toothed gears and/or shafts of the variable-speed gear unit are provided with incremental encoders and/or rotary encoders, and/or that the associated sensor system and sensors for sampling and/or reading the incremental encoders and/or rotary encoders are situated opposite same, in particular on a support element, in particular one sensor also being provided for each encoder. The encoders are preferably distributed on toothed gears and/or shafts of the variable-speed gear unit of the second level. The number of encoders and/or sensors used depends, among other factors, on the accuracy of the sensor system used, so that in principle three or five or even many more encoders, which in particular are simpler, may be used.

Furthermore, in one advantageous refinement the encoders which are integrated into the gear unit stages of the position display, and/or the sensor system which is provided, may form a single-stage electronic adjustment path sensor system.

In one special embodiment, the toothed gears of the variable-speed gear unit of the second level are mechanically coupled in such a way that one complete revolution of an encoder results in 1/32 of a revolution of the sequence encoder.

Thus, in particular adjustment paths in the range of 1.41 to 8; 8 to 45.3; 45.3 to 256; 256 to 1448; and 1448 to 8192 may be set and/or represented externally, i.e., nonintrusively, without intruding into the particular housing which accommodates the display device, by selection of the particular gears or gear ratios.

It is pointed out that, depending on the ranges of the adjustment paths to be covered and the sensors to be used, basically many different variants may be represented and/or implemented, and via the primary gearing of the system drive or actuator may be "displaced" as desired, also for larger or smaller adjustment paths.

In one advantageous refinement, it may also be provided that a processing device and an electronic display element, in particular an LCD, TFT display, or a touchscreen or some other type of display, are provided, the processing device evaluating the position information of the sensor system, i.e., all used sensors as a whole, and on this basis determining the position and/or adjustment position and/or adjustment path of a particular fitting, and/or sending the determined adjustment information to the electronic display element for display.

The electronic display element may advantageously be situated on a support element, in particular the second support element.

In addition, an interface for transmission and/or readout of the position information, in particular for transmission to a process control system and/or manufacturing execution system (MES), may advantageously be provided.

In a refinement, the interface may be provided as a LAN, WAN, Ethernet, USB, WLAN, Bluetooth, profibus, CAN, or CANopen interface, or a combination thereof.

In another embodiment, multiple seals for sealing the housing and display device with respect to contaminants and/or moisture may advantageously be provided.

Furthermore, the stated object is also achieved by an actuator having a display device of the type stated and described above.

Accordingly, the actuator for a fitting includes a housing and a display device, in particular a mechanical display device, that is inset and/or installed in the housing, which cooperates with the drive and has at least one mechanical display element and a signal gear unit, designed as a variable-speed gear unit, having at least two gears with different gear ratios, wherein a switching system is provided which is accessible and/or operable from the front side, i.e., front and/or front region, by means of which the different gears and/or gear ratios of the variable-speed gear unit may be selected and/or switched from the outside, i.e., outside [the housing], without intrusion into the housing and/or without opening the housing, and/or wherein the resolution of the display device and/or the motion of the at least one display element on the adjustment path of a particular actuator to be displayed and/or of a particular fitting may be selectively adjusted.

In one advantageous embodiment, the display device which is provided and used is a display device of the type stated and described above which is designed and refined according to the invention; the respective embodiment variants and features already stated within the scope of the display device for an actuator are not repeated at this point, but are merely referenced. Nevertheless, these are expressly included in the scope of protection for the actuator, and are also encompassed by the claimed actuator having a display device.

At least one coupling element, also referred to below as an external and/or drive-side coupling element, for the positive-fit and/or friction-fit connection and/or coupling of the drive shaft and/or the output drive shaft and/or the spindle of the drive to the display device and in particular to the planet wheel of the display device is advantageously provided in such a way that the planet wheel and/or the at least one mechanical display element carries out a motion which is proportional to the rotary motion of the drive.

The coupling element is advantageously magnetic and/or mechanical, for example having at least one drive wheel with a shaft.

In one advantageous refinement, the housing and display device are sealed and/or protected from contaminants multiple times, in particular twofold. The adjustment shaft and selector shaft and/or the first support element in particular are sealed with respect to the housing.

In another embodiment, the housing part which accommodates the display device includes built-in components for fixing and/or guiding the display device, for example a radially circumferentially extending molding or edge which is used as a stop.

In another advantageous embodiment, the actuator has a planetary gear, in particular a planetary differential gear, whose radially inner region is designed as a hollow shaft and which in turn has an output drive shaft that cooperates with the fitting to be operated, and having a drive, a drive shaft of the planetary gear being connected to the drive and being drivable by same, the drive shaft being designed as a first hollow shaft, and the output drive shaft being designed as a second hollow shaft, and the drive and the first and second hollow shafts have a common rotational axis, and a planet carrier is connected to the first hollow shaft, or with its radially inner region is designed as a first hollow shaft, in such a way that when the first hollow shaft rotates, the rotary motion is also carried out by the planet carrier, and at least the smaller of the two internal diameters of the hollow shafts is adapted to the dimensions in the transverse direction of an essentially longitudinally extended drive rod of a fitting which is connectable to the output drive shaft.

Accordingly, the first hollow shaft and planet carrier carry out identical synchronous rotary motions, and are fixedly or rigidly connected to one another and/or designed in one piece.

The invention as well as advantageous embodiments and refinements are explained further with reference to several figures and exemplary embodiments. The figures show the following:

DETAILED DESCRIPTION OF THE PREFERRED EMBODIMENTS

Figure 1:
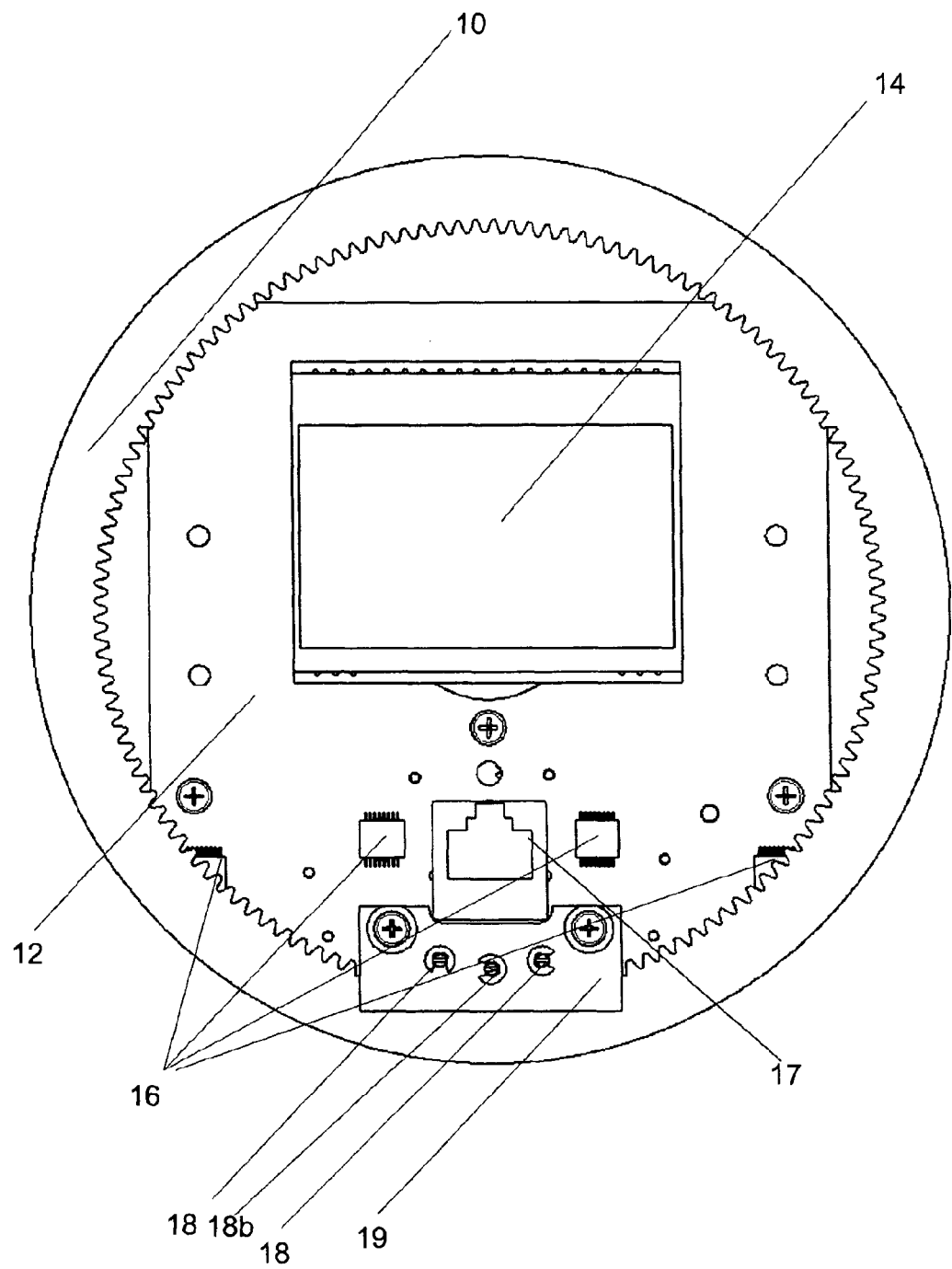
FIG. 1 shows a front view of one example of a design of a mechanical display device according to the invention.

FIG. 1 shows a front view (top view) of one example of a design of a display device according to the invention for an actuator for a fitting, the display device being insertable in a corresponding housing element of the drive, and in the inserted state interacting or cooperating with the drive, and in particular with the drive spindle or the drive shaft or output drive shaft, via at least one external coupling element provided for this purpose, in particular a shaft connected to the drive.

The display device according to FIG. 1 includes by way of example two mechanical display elements 10, 11 in the manner of two rotatable inscribed display rings having inner gearing, the inscription not being explicitly shown, and a signal gear unit, designed as a variable-speed gear unit, having five gears with different gear ratios, the different gears and/or gear ratios of the variable-speed gear unit (signal gear unit) advantageously being selectable and/or switchable externally, i.e., from outside the display device, even in the installed state of the display device, in particular inset in the corresponding housing of the particular actuator, in a "non-intrusive" manner, i.e., without opening the housing and/or removing and/or altering the gear unit, and in particular from the front side of the device, using a switching system 22, 23, 25, 42 via a control element 18b, and/or the resolution of the display device and/or the motion of the two display elements 10, 11 on the adjustment path to be displayed being selectively adaptable to a particular actuator and/or to a particular fitting.

Alternatively, the display elements could also be designed as a pointer, roller, or dial or segmented dial.

The control element 18b has means for attaching a tool, in the present case a slot, for example, for attaching a slotted screwdriver.

Alternatively, other means may be provided, such as a hexagon head or hexagon socket, or a pushbutton or rotary pushbutton in particular.

The variable-speed gear unit or signal gear unit of the display device is advantageously situated between and/or on essentially three support elements 19, 12, 26, which are essentially used for accommodating and/or guiding and/or retaining shafts and axles of the toothed gears used, and which may be structured in three levels or gear unit levels (see FIG. 3 through FIG. 7).

In addition, one or more support elements may be formed from printed circuit boards or printed circuit board material, and/or one or more toothed gears as well as shafts and/or axles may be made of plastic, in particular using injection molding processes. The use of plastic in particular results in weight and cost reductions, as well as increased resistance to contaminants and moisture.

In addition to the purely mechanical display option, a processing device (not explicitly indicated in FIG. 1) having an electronic display element 14, in particular an LCD, TFT display, or touchscreen or some other type of display, is provided on the second support element 12, and the processing device evaluates as a whole the position information of a sensor system having four incremental encoders 50 a, b, c, d and associated sensors 16, and on this basis determines the position and/or adjustment position and/or adjustment path of a particular fitting, and/or sends the determined adjustment information to the electronic display element 14 for display.

The angular position of the encoders is determined by magnetic scanning and/or by using segmented permanent magnets and an appropriate readout electronics system.

In principle, however, the angle could also be determined by optical means, in particular in the infrared range, for example using photodiodes and a laser diode as a sensor, and a segmented light-dark disk and/or a segmented disk having different reflection capabilities on a segment-specific basis.

In addition, an interface 17, in particular a communication interface, for transmitting and/or reading the position information, in particular for transmitting to a process control system and/or a manufacturing execution system (MES), may advantageously be provided.

The interface 17 may be provided as a LAN, WAN, Ethernet, USB, WLAN, Bluetooth, profibus, CAN, or CANopen interface, or a combination thereof.

In addition, two adjustment shafts 20 having further control elements 18 project from the first support element 19, and are used for end position adjustment and coordination of the two mechanical display elements 10, 11 to the particular fitting and/or the drive.

Electrical power may advantageously be supplied to the display device 14 via the particular drive and an interface provided for this purpose.

Figure 2:
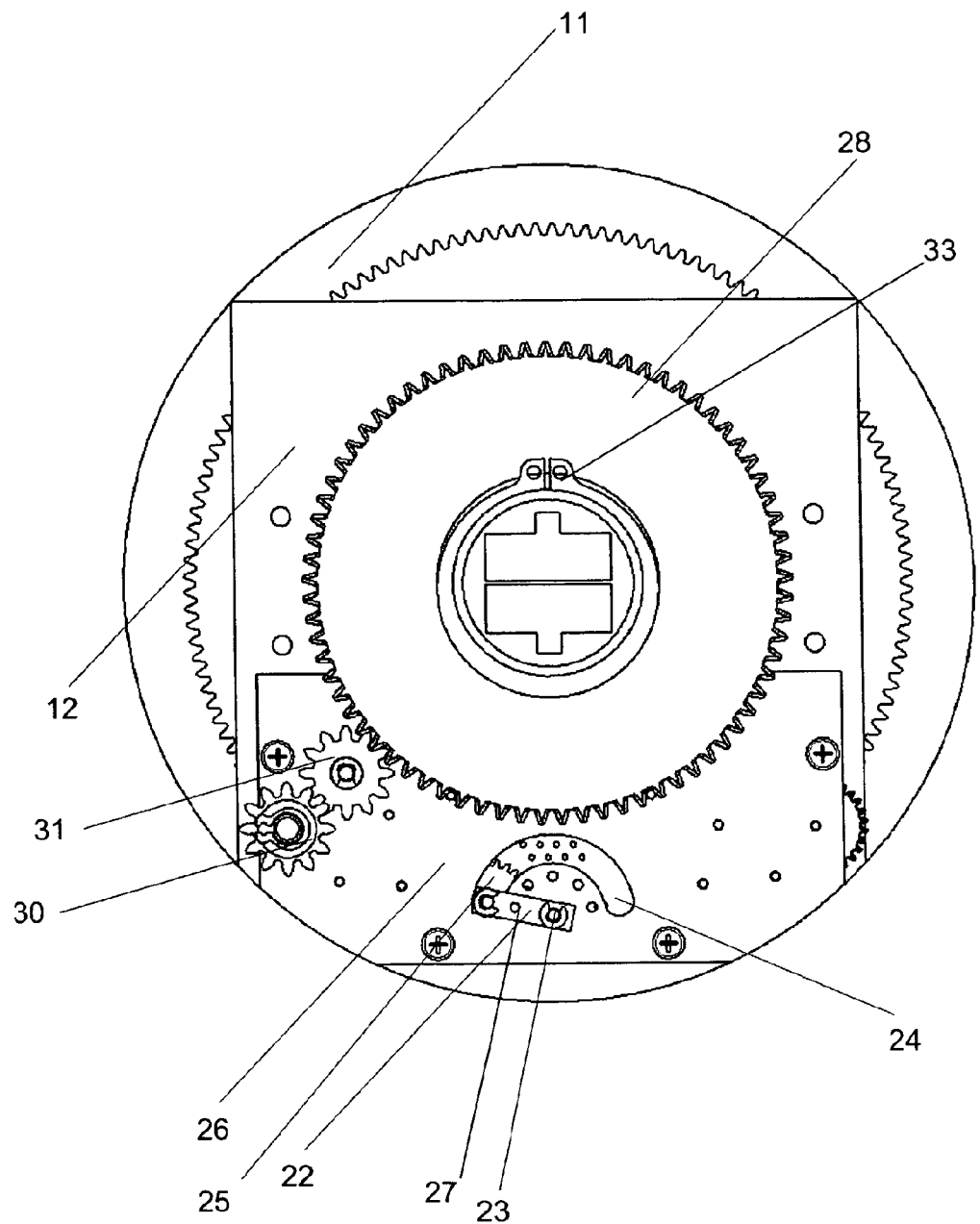
FIG. 2 shows a back view of one example of a design of a mechanical display device according to the invention, corresponding to FIG. 1.

FIG. 2 shows the back view of the display device known from FIG. 1, a first toothed gear set having a first intermediate wheel or planet wheel 28 with outer gearing which is rotatably supported centrally with respect to the display device on a central hollow bearing (central support) having an axial retaining ring 33 being provided in a third gear unit level E3, behind a third support element 26 (in the viewing direction from the front side facing the second and third support elements). This intermediate wheel 28, which has a comparatively large number of teeth, in particular 73 teeth, is used as a central coupling element between the drive wheel of a particular drive and the display device, and always allows a horizontal or level orientation of the display device, in particular an incremental orientation in 90° increments, regardless of the mounting position of the particular drive and/or the particular fitting.

As further coupling elements, in particular external or drive-side coupling elements, depending on the design one or more additional toothed gears, in particular a drive wheel, may be connected between the drive and the first intermediate wheel 28 or planet wheel.

In the present case, by way of example the first intermediate wheel 28 is coupled or connected in a positive-fit manner via at least one further toothed gear 31 having outer gearing to a first stepped toothed gear 30 having outer gearing, wherein a toothed gear stage in the third gear unit level E3 and a toothed gear stage in the next, second gear unit level E2 are situated on a common axle or shaft.

Instead of a stepped toothed gear, two toothed gears may be provided one behind the other on a shaft and rigidly or fixedly connected to the shaft. Both toothed gears are separated by the third support element 26, and are connected in a friction-fit manner solely via the shaft which passes through the third support element 26.

FIG. 2 also shows the clip-like or web-like switching element 22 of the switching system, the switching element 22 being mounted or retained at or on a selector shaft 23 or being fixedly connected thereto.

Also provided on the clip-like or web-like switching element 22 are a pin and/or an axle having at least one first ratchet wheel 25 which is supported in a rotatably movable manner, and a toothed gear having outer gearing which in five predetermined switching positions is in operative connection with each respective toothed gear of the toothed gear set of the second level E2 or is engaged with same.

Securing means are also advantageously provided, via which the switching element 22 may be secured and/or locked and/or snap-locked into the particular switching positions to prevent inadvertent twisting.

In the present case, by way of example the securing means include a locking bar 27 (merely indicated in the figure) which is designed as a pin or bolt and is situated or provided on the switching element 22. The locking bar may also be integrally molded onto the switching element 22.

To provide engagement for the locking bar 27, at the particular switching positions for locking and fixing the switching element, corresponding recesses 52 which are adapted to the locking bar are provided in the third support element 26, whereby the clip-like switching element 22 or the selector shaft 23 supporting same is, and/or is held, under elastic pretension, and as a result of the elastic pretension, in the switching position the particular locking bar 27 is pressed into the corresponding recess and is also held there in a rotationally fixed manner due to the pretension.

Thus, only when a force acts in the longitudinal direction on the selector shaft 23, against the applied elastic pretension, is it possible to unlock the switching system and in particular the switching element 22, thus allowing selection of a different switching position, and thus of a different gear ratio, by turning the switching element 22.

Figure 3:
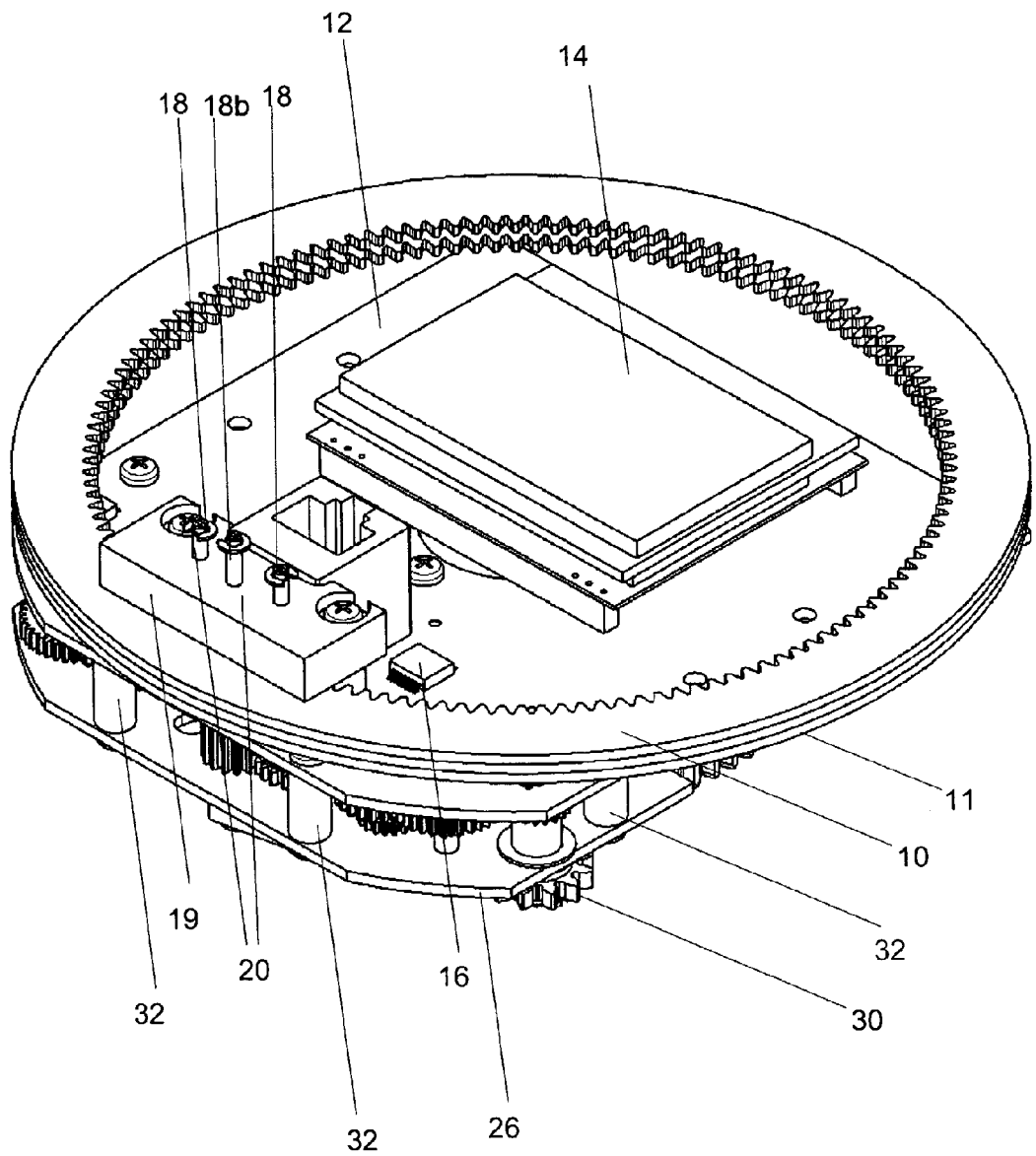
FIG. 3 shows a three-dimensional illustration of a display device corresponding to FIG. 1 and FIG. 2, FIG. 4 a) shows a sectional view and 4 b) shows a front view, in the viewing direction for an example of the display device corresponding to FIG. 1 through FIG. 3.

FIG. 3 shows a three-dimensional illustration of the display device known from FIG. 1 and FIG. 2, so that for explanation of the essential features reference is made to the description for FIG. 1 and FIG. 2.

FIG. 3 shows the first support element 19, second support element 12, and third support element 26, as well as the second gear unit level E2 which is defined by the second support element 12 and third support element 26 and which includes the actual variable-speed gear unit and a second toothed gear set associated therewith. Both support elements 12, 26 are oriented in parallel via corresponding spacers 32, and are rigidly and/or detachably connected to one another, in particular screwed or snap-locked. Also clearly shown are the two mechanical display elements 10, 11, having inner gearing and situated one behind the other, and the projecting control elements and shafts of the switching system 18b and end position setting/correction 18.

Figure 4:
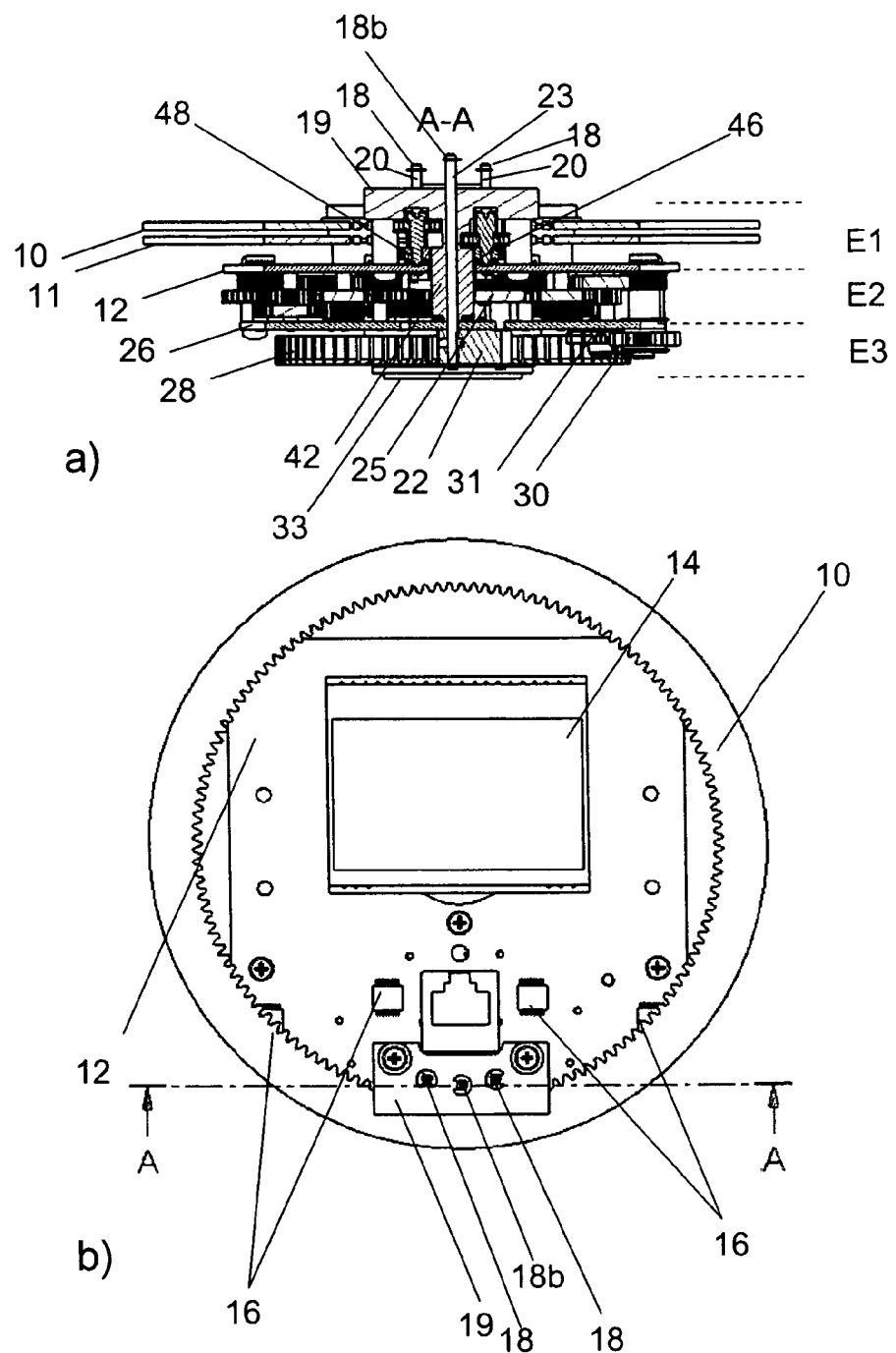

FIG. 4 a) shows a sectional view according to the section line indicated in FIG. 4 b) and viewing direction A-A. FIG. 4 b) corresponds to the front view or top view according to FIG. 1, so that here as well, for further explanation reference is made to the description for FIG. 1.

Figure 5:
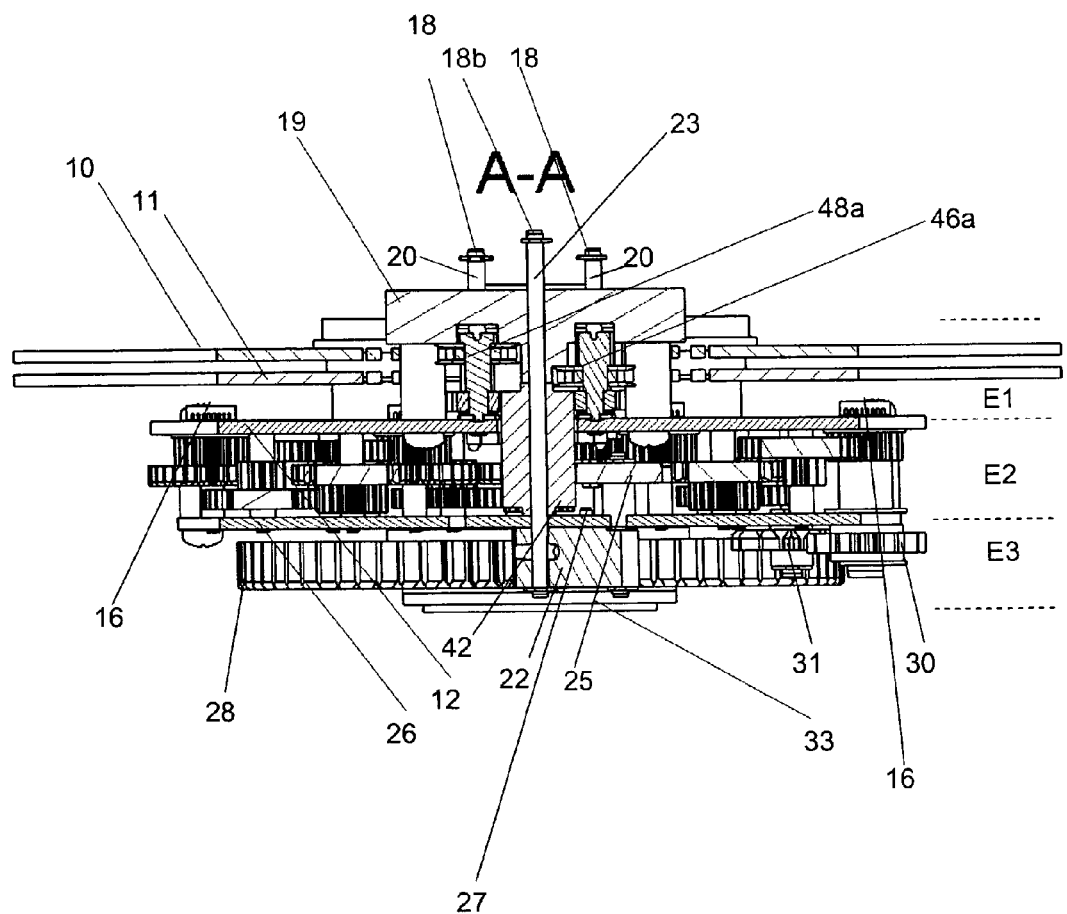
FIG. 5 shows an enlarged sectional view of an example of the display device corresponding to FIG. 4 a), FIG. 6 a) shows a side view from below, in the viewing direction for an example of the display device corresponding to FIG. 1 through FIGS. 3, and 6 b) shows a top view, corresponding to the viewing direction according to 6 a), of the variable-speed gear unit together with a switching system.

In the sectional view according to FIG. 4 a) and FIG. 5, the three support elements 19, 12, 26 used as well as the gear unit levels E1, E2, and E3 formed by same are shown.

In the second gear unit level E2, the figure also shows the actual variable-speed gear unit having multiple gear unit stages and the stepped toothed gears, having in particular two toothed gear stages and/or three gear unit stages, respectively.

As an alternative to a stepped toothed gear, in each case multiple toothed gears, in particular two toothed gears, having different toothing may be situated one behind the other and fixed on a shaft, and/or multiple toothed gears, in particular two toothed gears, having different toothing may be rigidly connected to one another and rotatably mounted one behind the other on an axle.

As known from FIG. 2, at least one central coupling element 28 is provided via which the gear unit and thus also the at least one display element 10, 11 may be coupled and/or connected in a positive-fit manner to the coupling element of a drive, in particular an actuator, in such a way that the at least one display element carries out a motion which is proportional in particular to the motion of the drive and/or of the drive shaft and/or the output drive shaft and/or the spindle of the drive.

In a further aspect, the variable-speed gear unit or signal gear unit is designed as a multistage gear unit, in particular a gear unit having five or more stages.

The various support elements are spaced apart from one another by spacers 32, and are oppositely situated and aligned in parallel.

The variable-speed gear unit or signal gear unit is advantageously designed as a spur gear unit.

In another embodiment, the selector shaft 23 passes through at least the first support element 19 to the third support element 26, and projects beyond the first support element 19 and/or the front side, i.e., front, of the display device, so that the switching element 22 is activatable or operable even when the display device is installed in a housing of an actuator and is in operation.

However, this means that the variable-speed gear unit (signal gear unit) or the various gear ratios may be switched and/or adjusted from the outside without removing or intruding into the display device, i.e., in a nonintrusive manner, when the display device is installed or is in operation.

A control element 18b is provided on the distal, i.e., outer, end of the selector shaft 23 which projects and/or protrudes from the front side of the display device. Associated with the switching system, a pin and/or an axle having at least one first ratchet wheel 25 which is supported in a rotatably movable manner, and a toothed gear having outer gearing and which in predetermined switching positions is in operative connection with each respective toothed gear of the variable-speed gear unit of the second level E2 or is engaged with same, is provided on the clip-like and/or web-like switching element 22. In addition, a further, second ratchet wheel 42 is provided on the selector shaft 23 in front of the switching element 22 (in the viewing direction from the front side facing the central wheel 28, or viewed from the first support element 19 in the direction of the second support element 12). The second ratchet wheel 42 having outer gearing has a longitudinally extended and/or cylindrical design, and extends from the second gear unit level E2 into the first gear unit level E1.

The second ratchet wheel 42 is advantageously in continuous operative connection with at least one first adjusting wheel 46 or engages with same, and depending on the number of display elements 10, 11, also with a further adjusting wheel 48 which is preferably coupled via a corresponding coupling, in particular a slide or magnetic coupling, to or with the display elements 10, 11 via corresponding intermediate wheels 46a, 48a. The intermediate wheels 46a, 48a engage directly with the inner gearing of the respective display elements 10, 11, and cause a rotary motion of same. Adjusting wheels 46, 48 as well as intermediate wheels 46a, 48a and the coupling connected in-between are situated between the first support element 19 and the second support element 12 on corresponding shafts, i.e., adjustment shafts 20. Adjusting wheels 46, 48 and intermediate wheels 46a, 48a are situated on corresponding adjustment shafts which project beyond the first support element or through which the first support element passes, and which are accessible from the front side using appropriate control elements 18. The end position setting of the two display elements 10, 11 may be achieved or realized via the control elements and adjustment shafts.

Figure 6:
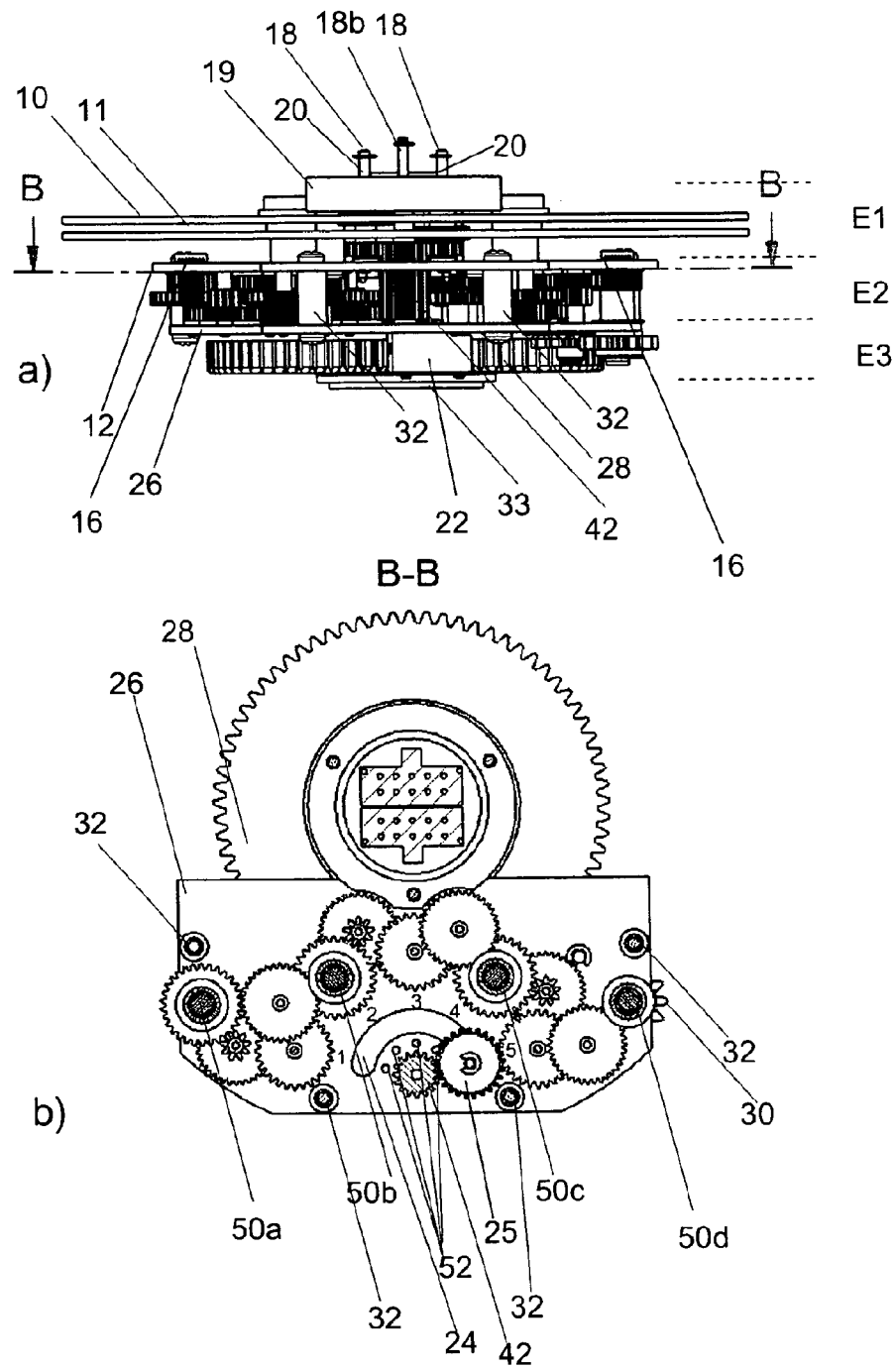
Figure 7:
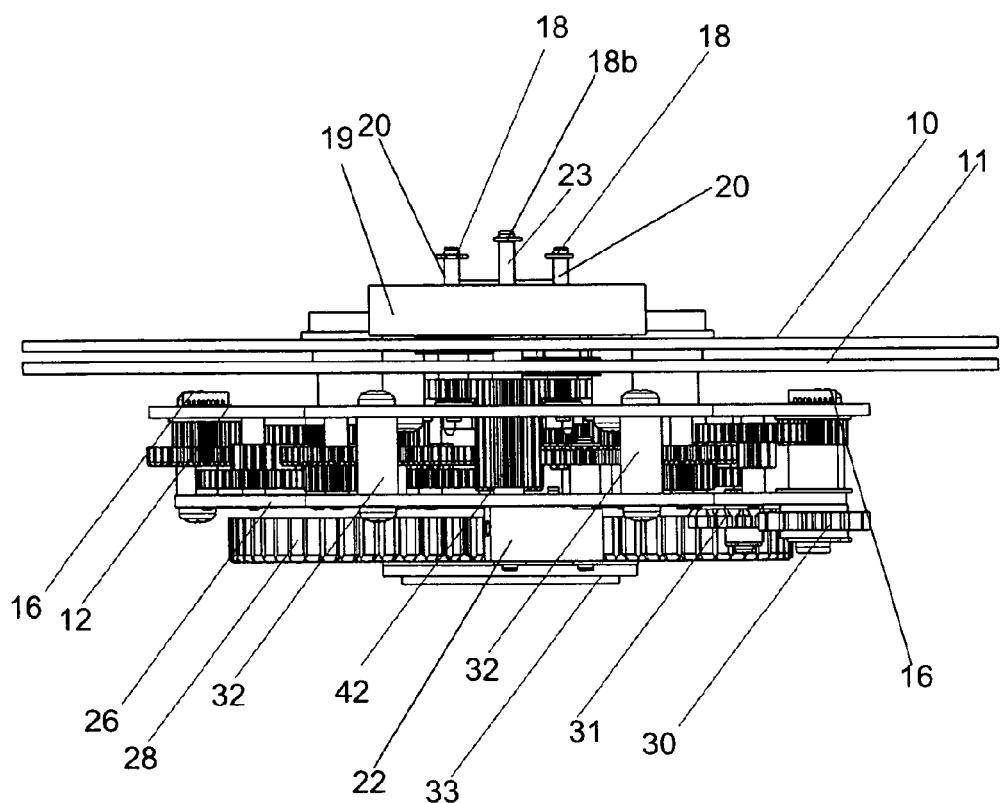
FIG. 7 shows an enlarged side view of an example of the display device corresponding to FIG. 6 a)

FIG. 6 b) shows a top view of the variable-speed gear unit together with the switching system having switching element 22 for the second gear unit level E2, according to the viewing direction in FIG. 6 a).

FIG. 6 a) shows the same essential features as already known in particular from FIG. 4 a), FIG. 5, and FIG. 1 and the associated description; therefore, a description of the features is not repeated here, and for the further explanation and illustration reference is made to the above description for the other figures.

FIG. 6 b) shows a top view, according to viewing direction B-B in FIG. 6 a), of the toothed gear set of the variable-speed gear unit of the second gear unit level E2 for a display device according to one of FIGS. 1 through 5.

It is clearly apparent that the toothed gear set of the second level includes multiple intermeshing toothed gears arranged in a partial circle, in particular a semicircle, which cooperate with the two display elements 10, 11 via the switching system and in particular the switching element 22.

In another embodiment, securing means are advantageously provided so that the clip-like and/or web-like switching element 22 may be secured and/or locked and/or snap-locked in the particular switching positions to prevent inadvertent twisting.

In a refinement, the securing means include a locking bar 27, in particular in the form of a pin or bolt, which is situated or provided on the switching element 22 (not explicitly indicated in FIG. 6b, but shown in FIG. 5). The locking bar may also be integrally molded onto the switching element 22.

In this regard, it may also be provided that the securing means include recesses 52 in the third support element 26 which are provided at the predetermined five switching positions 1 through 5 for locking the switching element 22, and which in particular are adapted to the size and/or shape of the particular locking bar. The clip or web of the switching element 22 is situated behind the third support element 26, so that in the switching position the locking bar 27 is able to engage from behind in a corresponding recess 52 in the third support element 26.

Alternatively, other arrangements and/or positionings of the switching element 22 and in particular of the clip or web thereof may be provided, for example also completely in front of the third support element 26, in which case the recess 24 in the shape of a partial circle could be dispensed with.

As further securing means, it may advantageously be provided that the selector shaft 23 supporting the clip-like switching element 22 is, and/or is held, under elastic pretension, and as a result of the elastic pretension is fixed and/or held in the predetermined switching position in that the particular locking bar 27 is pressed into the corresponding recess 52 and is also held there in a rotationally fixed manner due to the pretension.

Only when a force acts in the longitudinal direction on the selector shaft, against the elastic pretension, is it possible to unlock the switching system and in particular the switching element, thus allowing selection of a different switching position by turning the switching element 22, and selection of a different gear ratio.

In the design by way of example, the switching system has five lock and/or catch positions which correspond to the number of gears and/or gear ratios of the gear unit, which in FIG. 6b are numbered 1, 2, 3, 4, and 5.

The catch and/or lock positions are in particular equidistantly situated and/or distributed on a partial circle, in particular a semicircle.

A recess 24 and/or groove in the shape of a partial circle for guiding the switching element 22 is advantageously introduced into the third support element 26 or provided at that location.

It is further provided that when the display device is driven, all toothed gears of the variable-speed gear unit of the second level E2 are always in motion, regardless of the gear ratio selection.

It is particularly advantageous for all toothed gears used to be designed as spur gears and/or to be made of plastic, thus greatly simplifying the manufacturing process and the level of maintenance effort.

In addition, the support elements may advantageously be formed from printed circuit boards or printed circuit board material.

Furthermore, four toothed gears and/or shafts of the variable-speed gear unit are provided with incremental encoders and/or rotary encoders 50a, 50b, 50c, 50d, and/or the associated sensor system for sampling and/or reading the incremental encoders and/or rotary encoders is situated opposite same, in particular on a support element, in particular one sensor 16 also being provided for each encoder (see FIGS. 1 through 4).

When four angular sensor/encoder systems are appropriately used, each having a resolution of 10 bits, a full circle may advantageously be resolved into 1024 increments. The toothed gears of the variable-speed gear unit of the second level E2 may be mechanically coupled in such a way that one complete revolution of an encoder results in 1/32 of a revolution of the sequence encoder.

Thus, in particular adjustment paths in the range of 1.41 to 8; 8 to 45.3; 45.3 to 256; 256 to 1448; and 1448 to 8192 may be adjusted and/or represented externally, i.e., nonintrusively, by selection of the five gears or five gear ratios by way of example.

In another embodiment, the display device may be integrated and/or installed in a housing part of an actuator provided and prepared for this purpose, and may be coupled to same. In this regard, a corresponding cover for protecting the front of the display device, having recesses for the particular adjustment shaft 20 and selector shaft 23 to pass through, may be provided. Such a housing part is indicated by way of example in FIG. 8.

In one advantageous refinement, the housing and the display device are sealed with respect to contaminants and/or moisture multiple times, in particular twofold.

Accordingly, in another design the first support element 19 then forms a part of the housing or is installed leak-tight with respect to the housing.

Furthermore, the adjustment shafts 20 and/or selector shafts 23 may be sealed with respect to the first support element 19, using sealing rings.

In addition, a protective cover which is leak-tight with respect to the housing may be provided and/or mounted in front of the selector shaft 23 and respective adjustment shaft 20.

Figure 8:
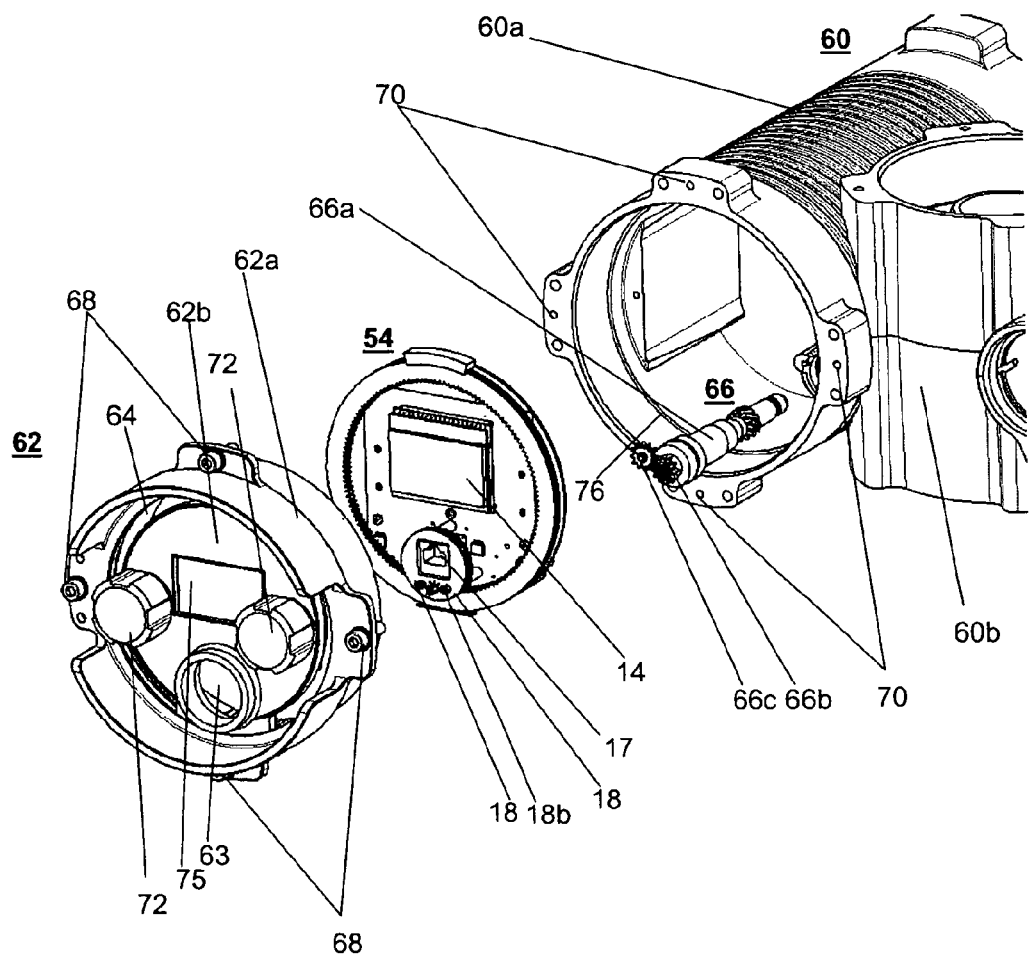
FIG. 8 shows a three-dimensional exploded view of an actuator housing having a front housing cover, and an example of a design of the display device corresponding to FIGS. 1 through 7.

FIG. 8 shows a three-dimensional exploded view of an actuator housing 60 having a front housing cover part 60a for accommodating a display device according to FIGS. 1 through 7, a front housing cover 62, and a second housing part 60b for accommodating the actual actuator.

The display device 54 for an actuator for a fitting shown in FIG. 8, having a design by way of example, may be inserted into a corresponding first housing part or housing element 60a, also referred to below as a housing part electronics system or housing element electronics system, of a particular actuator or a particular actuator housing 60, and in the installed state acts via at least one external, i.e., drive-side, coupling element 66 provided for this purpose, in particular a shaft 66a connected to the drive, in the example shown here a helical pinion shaft, having drive wheels 66b and 66c, and with respect to the toothing and dimensions the drive wheel 66c corresponds to the toothed gear 31, and the drive wheel 66b corresponds to the toothed gear 30, and the various drive wheels 66b, c and toothed gears 30, 31 are adapted and matched to one another in such a way that a 1:1 ratio of the drive or the shaft 66a to the intermediate wheel (planet wheel) 28, and a 1:1 ratio of the intermediate wheel to the mechanical position display, result, so that it is possible for the complete display to turn together with the drive and in particular with the drive spindle or the drive shaft or the output drive shaft of the actual actuator. In the mounting position, one of the drive wheels 66c engages with the outer gearing of the planet wheel 28.

In addition, the first housing part 60a is designed essentially as a hollow cylinder, so that the housing cover 62, including the display device 54, may be inserted, at least in part, into the first housing part 60a and/or projects into same. Furthermore, the actuator housing 60 has a further, second housing part 60b, also referred to below as "housing part gear unit," for connecting and/or accommodating the actual actuator and in particular the particular gear unit. The second housing part 60b is also designed essentially as a hollow cylinder, and/or is oriented in a rotation with respect to the first housing part 60a by approximately 90° perpendicular to the longitudinal axis. First housing part 60a and second 60b housing part and/or the respective actuator housing 60 may be designed in one piece.

The first housing part 60a or the housing part electronics system 60a which accommodates the display device 54 may be closed off and protected from external influences, and in particular from dust, soiling, and water spray, by using a front housing cover 62. The front housing cover 62 and the first housing part 60a have mutually complementary fastening means, in particular screws 68 and threaded holes 70, for detachably fastening, in particular screwing, the cover 62 to the first housing part 60a.

Furthermore, for better fixing and alignment of the cover 62 relative to the display device 54, additional installation and mounting aids, such as guide pins and associated boreholes, may be provided.

The display device 54 has two mechanical display elements 10, 11 in the manner of two rotatable inscribed display rings having inner gearing, the inscription not being explicitly shown, and a signal gear unit, designed as a variable-speed gear unit, having five gears with different gear ratios, the different gears and/or gear ratios of the variable-speed gear unit (signal gear unit) advantageously being selectable and/or switchable externally, i.e., from the outside, even in the installed state or mounting position of the display device, in particular inset in the corresponding first housing part 60a of the particular actuator, in a "nonintrusive" manner, i.e., without opening the housing and/or removing and/or altering the gear unit, and in particular from the front side of the device or the front housing cover 62, using a switching system 22, 23, 25, 42 via a control element 18b, and/or the resolution of the display device 54 and/or the motion of the two display elements 10, 11 being selectively adaptable to the adjustment path of a particular actuator to be displayed, and/or of a particular fitting.

In its essential features, the display device 54 corresponds to the exemplary embodiments according to FIG. 1 through FIG. 7, so that for further explanation and to avoid repetition, reference is made to the descriptions of the above-mentioned figures and to the figures themselves.

The front housing cover 62 has at least one recess 63 for the adjustment shaft 20 and selector shaft 23, or the control elements 18, 18b associated therewith, to pass through, and for access to the interface 17. On the front side the front housing cover 62 also has at least one rotary/retaining button 72, in particular two buttons.

The front housing cover 62 has an outer housing ring 62a, designed essentially as a hollow cylinder, which has fastening means 68 for connecting or fastening the front housing cover 62 to the first housing part 60.

The front housing cover 62 also has a support element 62b which is situated or supported in the housing ring 62a, and which in particular may be designed in a basin-like manner or as a hollow cylinder closed on one side, and/or used for accommodating and retaining electrical and mechanical components, and which has fastening means (not explicitly shown) for installing and/or fastening and fixing, in particular by screwing, the display device 54 in or on the front housing cover 62 and in particular the support element 62b. For this purpose, the front housing cover 62 and/or support element 62b each have complementary fastening means.

The display device 54 is mounted and fixed, in particular screwed in or on the front housing cover 62, via fastening means provided for this purpose, wherein the mechanical position display is or may be seen through at least one observation window 64, in particular a ring-like observation window in the support element 62b, in the present case a clear transparent plastic part by way of example.

The adjustment apparatus, in particular the variable-speed gear unit, of the display device 54 and in particular of the mechanical position display, i.e., essentially the adjustment shaft 20 and selector shaft 23 or the control elements 18, 18b associated therewith, are protected or protectable by means of a screw plug (not explicitly shown) which may be screwed into the recess 63 provided with an internal thread. The front housing cover 62, including the display device 54, is then screwed completely into the first housing part 60a as a unit, or is connected to the first housing part 60a in a friction-fit manner by screwing.

Also in the mounting position, it is then possible to twist and align the front housing cover 62 and display device 54, i.e., also the complete location/display control system, in particular in 90° increments, especially in the clockwise direction.

In addition to the purely mechanical display option, an electronic display element 14, in particular an LCD, TFT display, or touchscreen or some other type of display, is provided on which the particular determined adjustment information on the electronic display element 14 may be sent to the display. In this regard, an additional observation window or an associated recess 75 for viewing or for the electronic display element 14 to pass through is provided in the support element 62b.

Sealing means may also be provided which ensure that in the inset or installed state the housing interior is largely sealed and/or insulated from the environment and against moisture and soiling.

The display device 54 may be integrated and/or installed in the first housing part 60a of the actuator provided and prepared for this purpose, and may be coupled to same, whereby the actuator housing and in particular the first housing part 60a, front housing cover 62, and display device 54 are sealed with respect to one another multiple times, in particular two-fold, for protection from contaminants and/or moisture.

In addition, the first housing part 60a which accommodates the display device 54 includes built-in components for fixing and/or guiding the display device 54, for example a radially circumferentially extending molding or edge 76 which is used as a stop.

The open side of the first housing part 60a which is respectively opposite from the front housing cover 62 may be closed by a rear housing cover (not explicitly shown). This cover is also preferably connected, in particular screwed, to the first housing part 60a via appropriate fastening means.

Alternatively, such a cover may be integrally molded onto the first housing part 60a, and/or fixedly or nondetachably connected thereto.

The present invention also includes any given combinations of preferred embodiments or refinements, provided that these are not mutually exclusive.

LIST OF REFERENCE NUMERALS 1-5 Catch position, switching position
10 First mechanical display element
11 Second mechanical display element
12 Second support element
14 Electronic display element
16 Sensor (angle meter)
17 Interface
18 Control element adjustment shaft for end position adjustment
18b Control element selector shaft
19 First support element
20 Adjustment shaft
22 Switching element
23 Selector shaft
24 Recess in the shape of a partial circle
25 First ratchet wheel
26 Third support element
27 Locking bar
28 First intermediate wheel (planet wheel)
30 First stepped toothed gear
31 Further toothed gear
32 Spacer
33 Retaining ring
42 Second ratchet wheel
46 First adjusting wheel
46a Intermediate wheel
48 Second adjusting wheel
48a Intermediate wheel
50a, b, c, d Incremental encoder (rotary encoder)
52 Recess for locking bar engagement
54 Display device
60a Housing part electronics system
60b Housing part gear unit
62 Front housing cover
62a Housing ring
62b Support element (front housing cover)
63 Recess
66 External (drive-side) coupling element
68 Fastening screws
70 Threaded holes
72 Pushbutton
74 Observation window/clear part mechanical display observation window for electronic
75 Display
76 Stop

The invention claimed is:

1. A display device for an actuator comprising:
a mechanical display element;
a variable-speed signal gear unit, having at least two gears with different gear ratios, wherein a mechanical switching system is provided by means of which different gears and gear ratios of the variable-speed gear unit may be selected and switched from the outside, even when an operational display device is installed in a housing, without intrusion into the housing and without opening the housing, and wherein the resolution of the display device and the motion of the mechanical display element on the adjustment distance of a particular actuator to be displayed or of a particular fitting may be selectively adjusted;
wherein the switching system has a control element via which a desired gear ratio, even in the inset or installed state in a housing, is adjustable from the outside in such a way that it is not necessary to remove the display device or open the housing in order to adjust the gear ratio;
wherein the switching system has a clip-like or web-like switching element which is mounted or retained at or on a selector shaft and the switching element has a pin or an axle having a first ratchet wheel which is supported in a rotatably movable manner and which is engaged with a second ratchet wheel which is supported on the selector shaft in a rotatably movable manner and cooperates with same, and in predetermined switching positions the first ratchet wheel is engaged with a respective further toothed gear of the variable-speed gear unit and cooperates with same;
wherein the switching system has a number of lock or catch positions which corresponds to the number of gears or gear ratios of the gear unit;
wherein the catch or lock positions are situated or distributed approximately equidistantly on a partial circle;
wherein when the display device is driven, all toothed gears of the variable-speed gear unit are always in motion, regardless of the gear ratio selection;
wherein the variable-speed gear unit includes a toothed gear set having multiple intermeshing toothed gears arranged in a partial circle, which cooperate with the mechanical display element via the switching system;
wherein securing means are provided so that the clip-like or web-like switching element is secured and locked or snap-locked in the particular switching positions to prevent inadvertent twisting; and
wherein a planet wheel with outer gearing which is rotatably supported coaxially with the system is provided, which acts as a central coupling element between the drive wheel of a particular drive and the display device, and always allows a horizontal orientation of the display device, regardless of the mounting position of the particular drive or the particular fitting.

2. The display device according to claim 1, wherein means are provided via which the mechanical display element may be adjusted and adapted to the particular end position setting of the actuator or a fitting in the installed state of the display device, without opening the housing and without intruding into the housing.

3. The display device according to claim 1, wherein the motion of the mechanical display element is a rotary motion.

4. The display device according to claim 1, wherein the variable-speed gear unit is a multistage gear unit.

5. The display device according to claim 1, wherein the variable-speed gear unit has a stepped toothed gear.

6. The display device according to claim 1, wherein in addition, in each case multiple toothed gears, having different toothing are situated and/or fixed one behind the other on a shaft, and/or multiple toothed gears, having different toothing are rigidly joined together and rotatably situated one behind the other on an axle.

7. The display device according to claim 1, wherein the securing means include a locking bar, situated or provided on the clip-like or web-like switching element.

8. The display device according to claim 1, wherein the securing means have recesses in a support element or eyes provided at the predetermined switching positions for locking the switching element.

9. The display device according to claim 1, wherein the selector shaft which supports the clip-like or web-like switching element is, and/or is held, under elastic pretension, and as a result of the elastic pretension is fixed and/or held in the predetermined switching positions.

10. The display device according to claim 1, wherein an electronic adjustment path sensor system is provided, wherein multiple toothed gears and/or shafts of the variable-speed gear unit are provided with incremental encoders and/or rotary encoders, and/or the design of the electronic adjustment path sensor system and in particular of the incremental encoders integrated into the gear unit stages of the mechanical position display is provided as a single stage.

11. The display device according to claim 1, wherein by action of a force in the longitudinal and/or axial direction on the selector shaft, against the elastic pretension, is it possible to unlock the switching system and in particular the clip-like or web-like switching element, thus allowing selection of a different gear ratio.

12. The display device according to claim 10, wherein the associated sensor system for sampling and/or reading the incremental encoders and/or rotary encoders is situated opposite same.

13. The display device according to claim 10, wherein a processing device and an electronic display element are provided, the processing device evaluating the position information of the sensor system.

14. The display device according to claim 13, wherein the electronic display element is situated on a support element.

15. The display device according to claim 10, wherein an interface for transmission and/or readout of the position information for transmission to a process control system and/or manufacturing execution system, is provided.

16. The display device according to claim 15, wherein the interface is a LAN-, WAN-, Ethernet-, USB-, WLAN-, Bluetooth-, profibus-, CAN-, or CANopen-based interface, or a combination thereof.

17. The display device according to claim 1, wherein multiple seals for sealing the housing and display device with respect to contaminants and/or moisture are provided.

18. An actuator for a fitting which includes a housing and a mechanical display device that is inset or installed in the housing according to claim 1, which cooperates with the drive, and wherein a switching system is provided which is accessible and operable from the front of the housing by means of which the different gears and gear ratios of the variable-speed gear unit may be selected and switched from the outside without intrusion into the housing and without opening the housing, and wherein the resolution of the display device and the motion of the mechanical display element on the adjustment path of a particular actuator to be displayed or of a particular fitting may be selectively adapted.

19. The actuator according to claim 18, wherein a coupling element for the positive-fit and/or friction-fit connection and/or coupling of the drive shaft and/or the output drive shaft and/or the spindle of the drive to the display device and in particular to the planet wheel of the display device is provided in such a way that the planet wheel and/or the a mechanical display element carries out a motion which is proportional to the rotary motion of the drive.

20. The actuator according to claim 18, wherein the housing and the display device are sealed with respect to one another and/or protected from contaminants twofold.

21. The actuator according to claim 18, wherein a coupling element is provided for the positive-fit connection of the drive shaft and/or the output drive shaft to the display device.

22. The actuator according to claim 21, wherein the coupling element includes a drive wheel having a shaft.

\* \* \* \* \*